Oct. 8, 1946.  M. M. MARISIC ET AL  2,408,986
GEL BEADS
Filed April 15, 1944
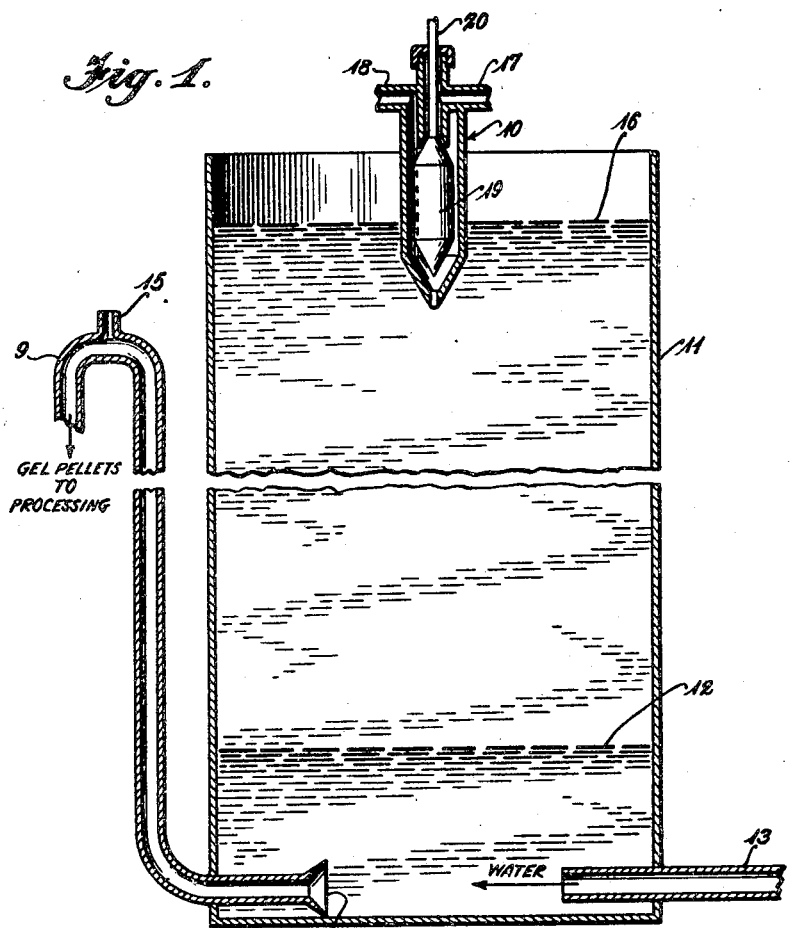
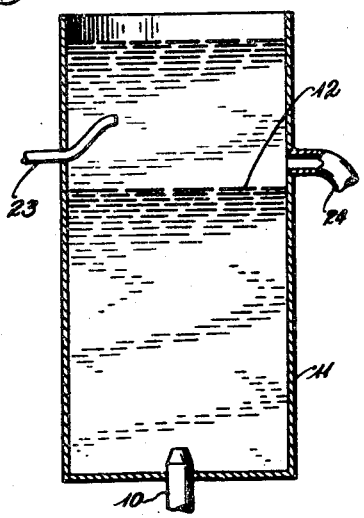
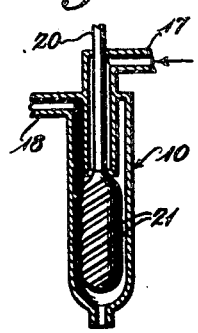
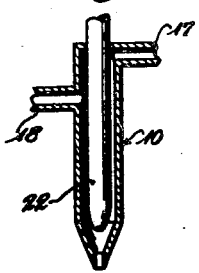
Inventors
Arthur C. Schmitt and
Milton M. Marisic
By Oswald G. Hayes
Attorney Patented Oct. 8, 1946

2,408,986

UNITED STATES PATENT OFFICE 2,408,986

GEL BEAD

Milton M. Marisic, Woodbury, and Arthur C. Schmitt, Wenonah, N. J., assignors to Socony-Vacuum Oil Company, Incorporated, a corporation of New York Application April 15, 1944, Serial No. 531,188

3 Claims. (Cl. 252—259.3)

This invention relates to spheroidal gel pellets of the general type described in the prior copending application of Milton M. Marisic, Serial No. 461,454, filed October 9, 1942, and is particularly concerned with a modification of the process of manufacture of said pellets to render the product more suitable for use as a catalyst in petroleum conversion reactions wherein the catalyst is contacted with hydrocarbons to be converted and thereafter treated with an oxidizing gas to regenerate the catalyst by burning carbonaceous deposits laid down during the catalytic conversion of hydrocarbons.

The said prior application describes preparation of a hydrocarbon conversion catalyst by formation of a gelable sol capable of setting after a predetermined time to a hydrogel of silica and at least one poly-valent metal oxide such as alumina, zirconia, thoria, beryllia, stannic oxide, etc. The sol is introduced to a body of a water-immiscible liquid, e. g., gas oil, in which it separates into a plurality of spheroidal hydrosol globules which set to firm hydrogel while in the body of oil. This catalyst is very satisfactory for conversion of hydrocarbons, being of unusually high catalytic activity and having smooth hard surfaces which prevent breakage losses and scoring of equipment. The spheroidal shape makes the "bead catalyst" very easy to handle.

The bead catalyst was found to have one serious disadvantage in that it regenerates more slowly than previously known pelleted synthetic cracking catalysts, i. e., the rate of oxidation of coke from cracking is lower. We have now found a method for modifying the catalyst during its manufacture to overcome this disadvantage.

This invention involves increasing the porosity of inorganic gels by dispersion of finely-divided combustible materials of 300 mesh size and smaller in gelable solutions or jellies prior to gelation; after gelation, purifying the hydrogel to remove water soluble salts and alkali metal ions when present; drying the hydrogel and finally removing the combustible materials by oxidation to form pores larger than those present in the original gel structure.

Inorganic gels, in general, have pores whose average diameters are below 100 Angstrom units ($1Å = 10^{-8}$ cm.) as computed from the ratio of total volume of the pores (pore volume) to the total surface area of the pores. Surface area is measured by the adsorption of nitrogen according to the method described by P. H. Emmett, in "Advances of Colloid Science," vol. I, chapter I, Interscience Publishers, Inc., New York, 1942. Pore volume is obtained from the surface area measurements when they are continued to the liquefaction pressure of nitrogen. Pore volume is the volume of nitrogen adsorbed on the gel in the neighborhood of the liquefaction pressure of nitrogen.

Plural oxide gels, such as silica-alumina gels, are known to be excellent catalysts for the conversion of hydrocarbons. The most efficient of these catalysts have average pore diameters ranging from 20 to 50Å. The diameters of the largest pores do not exceed about 100Å. We have found that by incorporating additional pores in the gel, according to this invention, so that the new pores have diameters larger than 100Å and ranging in size from 100Å to 0.04 millimeters, many advantages are realized which are not possessed by the original gel structure. These larger pores permit more rapid diffusion of hydrocarbon vapors and other gases throughout the gel structure; for this reason higher space velocities of hydrocarbons are possible and less time is required to regenerate the gel catalysts by oxidation when they have become fouled with carbonaceous material.

Gel catalysts having average pore diameters of about 20Å have not found commercial use, in spite of their high activity, because of the long contact times required to regenerate them. Introduction of pores having diameters larger than 100Å into these gels by the method of this invention, results in catalysts of practical value, since they may be regenerated by oxidation as rapidly as commercial catalysts.

Suitable apparatus for practice of the process of the invention is shown in the annexed drawing wherein:

Figure 1 is a section through a preferred form of the apparatus;

Figure 2 shows a modified type of a mixing nozzle;

Figure 3 is an illustration of a very simple mixing nozzle; and

Figure 4 is a view of a modified form of apparatus according to the invention.

Referring to Figure 1, a mixing nozzle indicated generally at 10, is mounted at the top of a column of water-immiscible fluid in a tank 11. At the bottom of tank 11 is a layer of water which forms an interface 12 with the column of said fluid. Water is continuously supplied through inlet 13 and withdrawn through outlet 14. The interface at 12 is maintained by properly adjusting the height of conduit 9 in correlation with the density of the fluid medium and the rate at which water is supplied at 13. Vent 15 prevents siphoning action. The flow of water carries away the gel pellets through outlet 14 and 9 to suitable washing and treating stages. The water in which the pellets are carried away is itself a washing medium and may include any desired treating material to act as a treating stage.

The colloidal solution from which the pellets are formed is made up and admitted to the column of fluid by the mixing nozzle 10. Preferably, the apparatus will include a plurality of nozzles 10 in order to increase the capacity of the unit, but only one is shown here for purposes of simplicity. The nozzle 10 includes means for completely dispersing two solutions in each other and admitting a continuous stream of the so-formed colloidal solution below the surface 16 of the water-immiscible fluid, wherein the stream of the colloidal solution breaks up into globules. The colloidal solution or globules thereof may be dropped on the surface of the fluid but this tends to break them and impairs control of pellet size obtained by injecting the colloidal solution under the surface of the liquid. It must be borne in mind, that considerable shrinkage takes place, not only by syneresis, but also during drying and processing. Control of globule size must take into account this shrinkage.

The size of the globules is controlled by the rate at which the colloidal solution flows through the nozzle orifice and the dimensions of the latter. A simple modification in controlling the size of the globules is the introduction of a baffle just outside of the nozzle mixer and in the stream of the colloidal solution. Furthermore, sizing is a matter of relative densities and viscosities of the colloidal solution and water-immiscible liquid.

In the mixing nozzle 10, solutions to be mixed are metered accurately and then admitted through lines 17 and 18 to a chamber which has a rotor 19 rotated by shaft 20 at a speed of at least about 1700 R. P. M. from a source of power not shown. The rotor 19 is constructed from a rectangular bar of metal whose edges are rounded off in such manner that the walls of the mixing chamber serve as a guide for them. The rounded edges of the rotors are grooved; thus efficient dispersion of both solutions in each other is maintained and gel formation is prevented in the mixing nozzle. The rotor may be fluted in any suitable manner or provided with other inequalities of surface to increase agitation in the mixing zone. Helical grooves for such purpose are shown on the rotor 21 of the modified form of mixing nozzle illustrated diagrammatically in Figure 2. The best operation of the mixing nozzle is realized when the rates of the reactant solutions are so high that the time the latter solutions spend in the mixing chamber is only a very small fraction of the gelation time.

A further modification is the extremely simple mixer of Figure 3, wherein the rotor 22 is merely a shaft which may be fluted, grooved, etc.

Another modification that may be applied to any of the mixing nozzles illustrated in Figures 1, 2 and 3 is to provide means for injecting air into the solutions admitted to the mixing chamber or to the mixing nozzle itself. By this means, hydrogel pellets are obtained which contain numerous small bubbles of air which serve to make the processed dry gel less dense in nature and more porous.

The apparatus of Figure 4 is adapted for upward flow of the colloidal solution during gelation. In this case, the mixing nozzle 10 is positioned at the bottom of shell 11 which contains a column of water-immiscible liquid heavier than water, with water thereabove, the liquid-liquid interface being again indicated at 12. Water is admitted by a pipe 23 while water carrying gelled spheroids is withdrawn by discharge line 24.

An acid solution was prepared by mixing 30 grams of lamp black of 325 mesh size and smaller with 14.34 liters of 1.447 normal hydrochloric acid and 2.700 liters of aluminum sulfate solution containing 41.0 grams $Al_2O_3$ per liter.

A sodium silicate solution containing 208 grams $SiO_2$ per liter was prepared by diluting "N" brand sodium silicate with water and mixed in the nozzle mixer with the above acid solution in the ratio of 1.00 volume of sodium silicate solution to 1.704 volumes of the acid solution to form a sol which had a pH of 6.1 and a gelation time of 20 seconds. This silica-alumina hydrosol impregnated with lamp black was extruded into a column of oil to form hydrogel beads which were washed and dried in the conventional manner.

The gel beads were heat treated at 1100° F. for five hours during which time the lamp black was completely oxidized. The beads were hard, vitreous and opaque in appearance due to the extra pores incorporated into the gel structure.

This catalyst, when tested under standard cracking conditions, was found to have an activity of 42%.

We claim:

1. A process for preparing spheroidal inorganic oxide gel particles of improved characteristics which comprises forming a hydrosol of inorganic oxide characterized by an inherent capacity to set to a hydrogel upon the lapse of a suitable period of time without addition to or subtraction from said sol of any substance, effecting dispersion in said sol of particles of a combustible solid of less than 300 mesh size, admitting said sol in the form of separate globules to a body of a liquid medium substantially immiscible with water in which said globules assume spheroidal shape due to surface tension at the interface between said sol and said liquid medium, retaining said spheroidal globules in said medium until gelation occurs, effecting retention in said sol of substantially all the constituents of said sol until gelation occurs, drying the spheroidal hydrogel and burning said combustible solid by contacting the dried gel with an oxidizing gas at combustion temperature.

2. A process for preparing spheroidal inorganic oxide gel particles of improved characteristics which comprises forming a hydrosol of inorganic oxide including silica characterized by an inherent capacity to set to a hydrogel upon the lapse of a suitable period of time without addition to or subtraction from said sol of any substance, effecting dispersion in said sol of particles of a combustible solid of less than 300 mesh size, admitting said sol in the form of separate globules to a body of a liquid medium substantially immiscible with water in which said globules assume spheroidal shape due to surface tension at the interface between said sol and said liquid medium, retaining said spheroidal globules in said medium until gelation occurs, effecting retention in said sol of substantially all the constituents of said sol until gelation occurs, drying the spheroidal hydrogel and burning said combustible solid by contacting the dried gel with an oxidizing gas at combustion temperature.

3. A process for preparing spheroidal inorganic oxide gel particles of improved characteristics which comprises forming a hydrosol of inorganic oxide including silica and a metal oxide characterized by an inherent capacity to set to a hydrogel upon the lapse of a suitable period of time without addition to or subtraction from said sol of any substance, effecting dispersion in said sol of particles of a combustible solid of less than 300 mesh size, admitting said sol in the form of separate globules to a body of a liquid medium substantially immiscible with water in which said globules assume spheroidal shape due to surface tension at the interface between said sol and said liquid medium, retaining said spheroidal globules in said medium until gelation occurs, effecting retention in said sol of substantially all the constituents of said sol until gelation occurs, drying the spheroidal hydrogel and burning said combustible solid by contacting the dried gel with an oxidizing gas at combustion temperature.

MILTON M. MARISIC.
ARTHUR C. SCHMITT.